(12) United States Patent
Parann-Nissany

(10) Patent No.: US 8,625,802 B2
(45) Date of Patent: Jan. 7, 2014

(54) METHODS, DEVICES, AND MEDIA FOR SECURE KEY MANAGEMENT IN A NON-SECURED, DISTRIBUTED, VIRTUALIZED ENVIRONMENT WITH APPLICATIONS TO CLOUD-COMPUTING SECURITY AND MANAGEMENT

(75) Inventor: Gilad Parann-Nissany, Ramat Hasharon (IL)

(73) Assignee: Porticor Ltd., Ramat Hasharon (IL)

( * ) Notice: Subject to any disclaimer, the term of this patent is extended or adjusted under 35 U.S.C. 154(b) by 400 days.

(21) Appl. No.: 13/160,535

(22) Filed: Jun. 15, 2011

(65) Prior Publication Data

US 2011/0311055 A1   Dec. 22, 2011

Related U.S. Application Data

(63) Continuation-in-part of application No. 12/887,547, filed on Sep. 22, 2010.

(60) Provisional application No. 61/355,155, filed on Jun. 16, 2010.

(51) Int. Cl.
*H04L 9/08* (2006.01)

(52) U.S. Cl.
USPC ........... 380/278; 380/277; 380/279; 713/171; 726/36

(58) Field of Classification Search
USPC .............. 380/227, 278, 279; 713/171; 726/36
See application file for complete search history.

(56) References Cited

U.S. PATENT DOCUMENTS

| | | | | |
|---|---|---|---|---|
| 4,281,216 A | * | 7/1981 | Hogg et al. .................... | 380/277 |
| 5,109,413 A | * | 4/1992 | Comerford et al. ............. | 705/54 |
| 5,717,760 A | * | 2/1998 | Satterfield ....................... | 380/28 |
| 6,385,727 B1 | * | 5/2002 | Cassagnol et al. ............. | 713/193 |
| 6,775,656 B1 | * | 8/2004 | Gettwart et al. ............... | 705/401 |
| 7,234,645 B2 | * | 6/2007 | Silverbrook et al. ......... | 235/494 |
| 7,684,568 B2 | * | 3/2010 | Yonge et al. .................. | 380/262 |
| 7,716,662 B2 | * | 5/2010 | Seiden .......................... | 717/173 |
| 7,848,515 B2 | * | 12/2010 | Dupaquis et al. .............. | 380/28 |
| 8,027,304 B2 | * | 9/2011 | Forsberg ....................... | 370/331 |
| 8,060,756 B2 | * | 11/2011 | Rao et al. ...................... | 713/190 |
| 8,179,860 B2 | * | 5/2012 | Brusilovsky et al. ......... | 370/331 |
| 8,472,627 B2 | * | 6/2013 | Denning et al. .............. | 380/258 |
| 8,509,449 B2 | * | 8/2013 | Ureche et al. ................. | 380/284 |
| 2002/0099517 A1 | * | 7/2002 | Brendon et al. .............. | 702/165 |
| 2003/0002665 A1 | * | 1/2003 | Sako et al. ...................... | 380/37 |
| 2004/0117262 A1 | * | 6/2004 | Berger et al. .................. | 705/16 |

(Continued)

*Primary Examiner* — Thu Ha Nguyen
(74) *Attorney, Agent, or Firm* — Reuven K. Mouallem; FlashPoint IP Ltd.

(57) ABSTRACT

The present invention discloses methods, devices, and media for secure key management in a non-secured, distributed, virtualized environment with applications to cloud-computing security and management. Methods include the steps of: receiving an encryption request for protecting an original key at a first encryption location in a network computing-environment; initially encrypting the original key with a first location-specific secure-key, located at a second encryption location, to create a location-specific initially-encrypted key; and finally encrypting the location-specific initially-encrypted key with a second location-specific secure-key, located at a third encryption location, to create a finally-encrypted key which may then be used in any way in a cipher-location; wherein the locations are regions of memory located in computing devices operationally connected to the network computing-environment; and wherein each of the location-specific secure-keys is protected from compromise by any owner of other location-specific secure keys using an appropriate technique in the respective locations.

26 Claims, 2 Drawing Sheets

(56) References Cited

U.S. PATENT DOCUMENTS

| | | | |
|---|---|---|---|
| 2005/0283566 A1* | 12/2005 | Callaghan | 711/104 |
| 2006/0069926 A1* | 3/2006 | Ginter et al. | 713/194 |
| 2007/0060127 A1* | 3/2007 | Forsberg | 455/436 |
| 2008/0019503 A1* | 1/2008 | Dupaquis et al. | 380/28 |
| 2008/0034205 A1* | 2/2008 | Alain et al. | 713/160 |
| 2008/0288785 A1* | 11/2008 | Rao et al. | 713/190 |
| 2009/0055924 A1* | 2/2009 | Trotter | 726/20 |
| 2009/0060197 A1* | 3/2009 | Taylor et al. | 380/277 |
| 2009/0249222 A1* | 10/2009 | Schmidt et al. | 715/751 |
| 2010/0042846 A1* | 2/2010 | Trotter et al. | 713/182 |
| 2010/0131775 A1* | 5/2010 | Jogand-Coulomb et al. | 713/193 |
| 2010/0223456 A1* | 9/2010 | Schneider | 713/152 |
| 2011/0038480 A1* | 2/2011 | Lin | 380/270 |
| 2011/0145602 A1* | 6/2011 | Ginter et al. | 713/193 |
| 2011/0162062 A1* | 6/2011 | Kumar et al. | 726/15 |
| 2011/0289576 A1* | 11/2011 | Cheng | 726/9 |
| 2011/0311055 A1* | 12/2011 | Parann-Nissany | 380/278 |
| 2012/0047373 A1* | 2/2012 | Rao et al. | 713/190 |
| 2012/0233652 A1* | 9/2012 | Drope | 725/114 |
| 2013/0054886 A1* | 2/2013 | Eshraghian et al. | 711/108 |

* cited by examiner

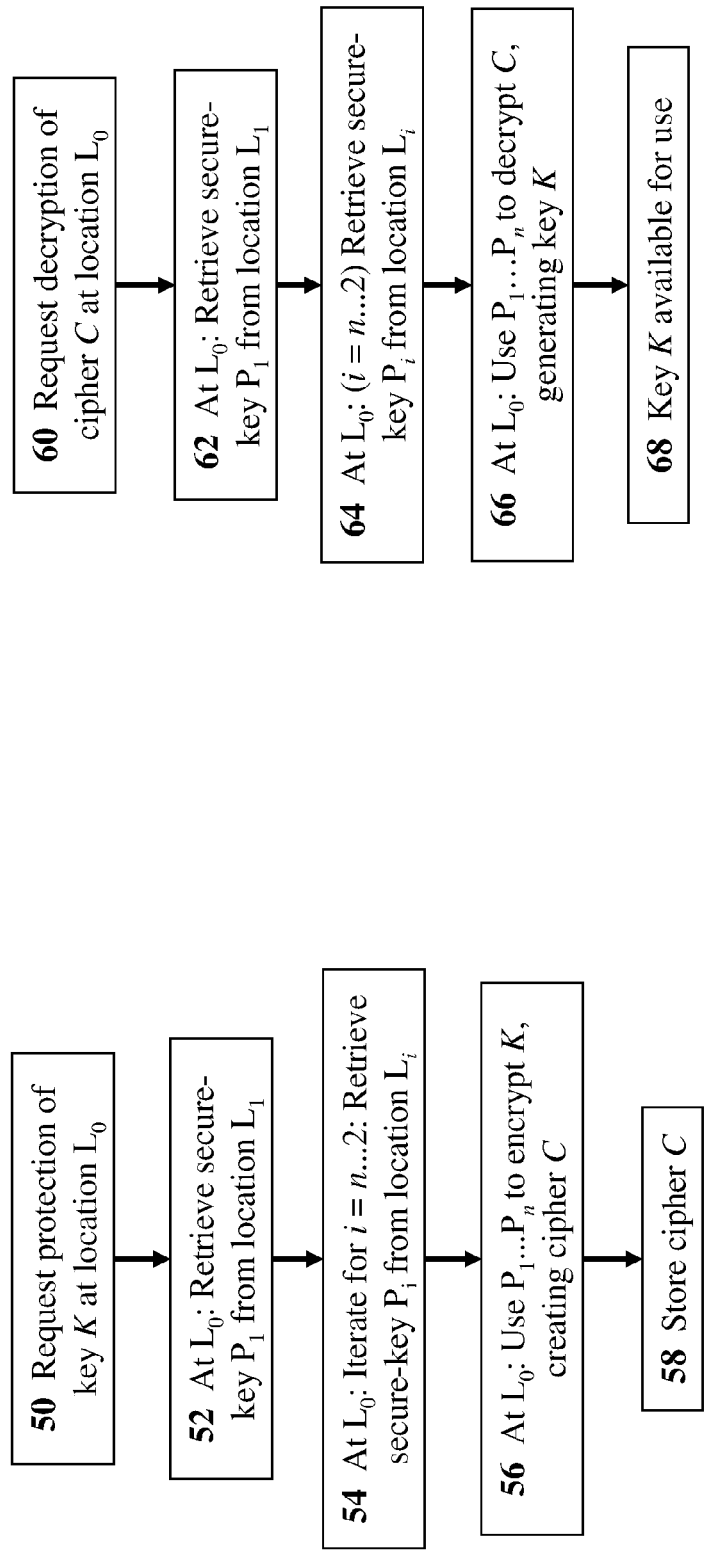

METHODS, DEVICES, AND MEDIA FOR SECURE KEY MANAGEMENT IN A NON-SECURED, DISTRIBUTED, VIRTUALIZED ENVIRONMENT WITH APPLICATIONS TO CLOUD-COMPUTING SECURITY AND MANAGEMENT

CROSS REFERENCE TO RELATED APPLICATIONS

This patent application is a continuation-in-part (CIP) of U.S. patent application Ser. No. 12/887,547, filed on Sep. 22, 2010, which is hereby incorporated by reference in its entirety.

This patent application claims priority under 35 U.S.C. §119(e) to U.S. Provisional Patent Application No. 61/355,155 filed Jun. 16, 2010, which is hereby incorporated by reference in its entirety.

FIELD AND BACKGROUND OF THE INVENTION

The present invention relates to methods, devices, and media for secure key management in a non-secured, distributed, virtualized environment with applications to cloud-computing security and management.

A trend in modern computer networking, web-, and cloud-computing, is to rely on public, group, or virtualized resources. The IT (information technology) marketplace offers public, private, and hybrid solutions for "virtualization" and "cloud computing." This growing trend is occurring at many levels: infrastructure, platform, and software.

A recurring problem hampering such solutions is the fact that "virtualized" and/or "cloud" solutions are by their very nature non-secured and distributed. The resources may be physically owned by different entities other than the users, or may be shared among multiple users (having existing security, privacy, and trust concerns). This may occur within one legal entity or among different entities.

For example, a file may be saved in a network "storage cloud." Since the storage cloud is a shared resource, a user is entrusting his/her data to a resource that is to routinely accessed by many other users, over which the user has no control at all.

Vendors of cloud and virtualization solutions provide various mechanisms (e.g. authentication, authorization, and virtual private networks) to ameliorate this state of affairs. Such approaches are significant but incomplete. Such mechanisms do not solve various important problems (e.g. encryption at rest, single point for security handling, key management, and requiring the user to trust the provider, the provider's implementation, or the provider's staff).

Of course, one solution for the security-conscious consumer is to avoid shared resources altogether. However, such an option is an unpleasant choice for the user, since modern shared resources provide many economic, operational, and technical benefits.

It would be desirable to have methods, devices, and media for secure key management in a non-secured, distributed, virtualized environment with applications to cloud-computing security and management. Such methods, devices, and media would, inter alia, overcome the limitations mentioned above.

SUMMARY OF THE INVENTION

It is the purpose of the present invention to provide methods, devices, and media for secure key management in a non-secured, distributed, virtualized environment with applications to cloud-computing security and management.

In the interest of clarity, several terms which follow are specifically defined for use herein. The term "virtualization" is used herein to refer to any means of executing software in an environment separated from the underlying hardware resources, including, but not limited to: hardware virtualization, software virtualization, memory virtualization, database virtualization, data virtualization, to storage virtualization, application virtualization, desktop virtualization, and network virtualization.

The term "resource" is used herein to refer to any computing service which provides data storage, computing, networking capacity, algorithmic capabilities, software capabilities, and/or software-based objects using hardware or software provided by any service provider.

Furthermore, it is noted that the term "exemplary" is used herein to refer to examples of embodiments and/or implementations, and is not meant to necessarily convey a more-desirable use-case. Similarly, the terms "preferred" and "preferably" are used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Preferred embodiments of the present invention enable the ability to securely manage keys, and to use such keys to secure resources (both existing and future) that are non-secure, without impairing the functionality of the existing resources.

Preferred embodiments of the present invention enable a security-conscious consumer to use available public, private, hybrid, and shared resources from providers or vendors, while enjoying full security and control. Preferred embodiments of the present invention provide the ability to secure resources that are non-secured, without impairing the functionality of the resources. Preferred embodiments of the present invention enable non-secured resources to be secured and controlled more completely, while maintaining the benefits of the emerging shared-resource model.

Preferred embodiments of the present invention secure the non-secured resources without replacing the resources, but rather make the resources more secure to while in use. Such embodiments can employ existing mechanisms (e.g. authentication, authorization, and encryption) in conjunction with additional mechanisms in stand-alone implementations or enhancement implementations to existing mechanisms.

Preferred embodiments of the present invention enable the establishment of trust in an "imperfectly-trusted" environment, allowing a user to have confidence in the security of shared or public resources, even if the user does not have perfect trust in the provider of the resource, the provider's implementation, or the provider's staff.

Preferred embodiments of the present invention enable the enhancement of security and trust beyond what is achievable in private or unshared solutions, overcoming the challenges to security and control associated with the public or shared nature of typical virtualized/cloud resources.

Preferred embodiments of the present invention are applicable in public, private, and hybrid scenarios in which secure resources may belong to different legal entities.

Other preferred embodiments of the present invention provide algorithmic methods for advanced security applications.

Therefore, according to the present invention, there is provided for the first time a method for secure key management, the method including the steps of: (a) receiving an encryption request for protecting an original key at a first encryption location in a network computing-environment; (b) initially encrypting the original key with a first location-specific secure-key, the first location-specific secure-key located at a second encryption location, to create a location-specific initially-encrypted key; and (c) finally encrypting the location-specific initially-encrypted key with a second to location-specific secure-key, the second location-specific secure-key located at a third encryption location, to create a finally-encrypted key which may then be used in any way in a cipher-location; wherein the locations are regions of memory located in computing devices operationally connected to the network computing-environment; and wherein each of the location-specific secure-keys is protected from compromise by any owner of other location-specific secure keys using an appropriate technique in the respective locations.

Preferably, the step of initially encrypting is performed by transferring the original key to the second encryption location.

Preferably, the step of finally encrypting is performed by transferring the location-specific initially-encrypted key to the third encryption location.

Preferably, the step of initially encrypting is performed by transferring the first location-specific secure-key to the first encryption location.

Preferably, the step of finally encrypting is performed by transferring the second location-specific secure-key to the first encryption location or the second encryption location.

Preferably, at least two of the first encryption location, the second encryption location, and the third encryption location are the same location.

Preferably, the step of encrypting is performed iteratively at subsequent encryption locations using subsequent location-specific secure-keys to create location-specific intermediately-encrypted keys, and wherein the finally-encrypted key is a final result of the location-specific intermediately-encrypted keys.

Preferably, the appropriate technique is selected from the group consisting of: forbidding transfer of any secure-key from its respective location, allowing transfer of any secure-key only after homomorphic encryption, allowing transfer of any secure-key only after applying an encryption process which allows the secure-key to be used securely without its original value becoming freely-accessible, and allowing transfer of any secure-key for caching or storage only after encryption.

Preferably, the method further includes the steps of: (d) upon receiving a decryption request for decrypting the finally-encrypted key at the cipher location, initially decrypting the finally-encrypted key with the second location-specific secure-key to create a location-specific initially-decrypted key; and (e) finally decrypting the location-specific initially-decrypted key with the first location-specific secure-key to generate a finally-decrypted key which is the original key.

Preferably, the step of initially decrypting is performed by transferring the finally-encrypted key to the second encryption location.

Preferably, the step of finally decrypting is performed by transferring the location-specific initially-decrypted key to the first encryption location.

Preferably, the step of initially decrypting is performed by transferring the second location-specific secure-key to the cipher location.

Preferably, the step of finally decrypting is performed by transferring the first location-specific secure-key to the cipher location or the second location.

Preferably, the step of decrypting is performed iteratively at subsequent decryption locations using subsequent location-specific secure-keys to create location-specific intermediately-decrypted keys, and wherein the finally-decrypted key is a final result of the location-specific intermediately-decrypted keys.

Preferably, the method further includes the step of: (d) upon receiving a decryption request for decrypting the finally-encrypted key at the cipher location, locating the location-specific secure-keys in entity locations other than the cipher to location, wherein the entity locations are maintained by at least two respective legal entities for controlling the location-specific secure-keys, whereby the step of locating facilitates fulfilling the decryption request.

According to the present invention, there is provided for the first time a device for secure key management, the device including: (a) a server including: (i) a CPU for performing computational operations; (ii) a memory module for storing data; and (iii) a network connection for communicating across a network; and (b) a protection module, residing on the server, configured for: (i) receiving an encryption request for protecting an original key at a first encryption location in a network computing-environment; (ii) initially encrypting, on any computing device operationally connected to the network computing-environment, the original key with a first location-specific secure-key, the first location-specific secure-key located at a second encryption location, to create a location-specific initially-encrypted key; and (iii) finally encrypting, on any computing device operationally connected to the network computing-environment, the location-specific initially-encrypted key with a second location-specific secure-key, the second location-specific secure-key located at a third encryption location, to create a finally-encrypted key which may then be used in any way in a cipher-location; wherein the locations are regions of memory located in computing devices operationally connected to the network computing-environment; and wherein each of the location-specific secure-keys is protected from compromise by any owner of other location-specific secure keys using an appropriate technique in the respective locations.

Preferably, the initially encrypting is performed by transferring the original key to the second encryption location.

Preferably, the finally encrypting is performed by transferring the location-specific initially-encrypted key to the third encryption location.

Preferably, the initially encrypting is performed by transferring the first location-specific secure-key to the first encryption location.

Preferably, the finally encrypting is performed by transferring the second location-specific secure-key to the first encryption location or the second encryption location.

Preferably, at least two of the first encryption location, the second encryption location, and the third encryption location are the same location.

Preferably, the encrypting is performed iteratively at subsequent encryption locations using subsequent location-specific secure-keys to create location-specific intermediately-encrypted keys, and wherein the finally-encrypted key is a final result of the location-specific intermediately-encrypted keys.

Preferably, the appropriate technique is selected from the group consisting of: forbidding transfer of any secure-key from its respective location, allowing transfer of any secure-key only after homomorphic encryption, allowing transfer of any secure-key only after applying an encryption process which allows the secure-key to be used securely without its original value becoming freely-accessible, and allowing transfer of any secure-key for caching or storage only after encryption.

Preferably, the protection module is further configured for: (iv) upon receiving a decryption request for decrypting the finally-encrypted key at the cipher location, initially decrypting the finally-encrypted key with the second location-specific secure-key to create a location-specific initially-decrypted key; and (v) finally decrypting the location-specific initially-decrypted key with the first location-specific secure-key to generate a finally-decrypted key which is the original key.

Preferably, the protection module is further configured for: (iv) upon receiving to a decryption request for decrypting the finally-encrypted key at the cipher location, locating the location-specific secure-keys in entity locations other than the cipher location, wherein the entity locations are maintained by at least two respective legal entities for controlling the location-specific secure-keys, whereby the locating facilitates fulfilling the decryption request.

According to the present invention, there is provided for the first time a computer-readable storage medium having computer-readable code embodied on the computer-readable storage medium, the computer-readable code including: (a) program code for receiving an encryption request for protecting an original key at a first encryption location in a network computing-environment; (b) program code for initially encrypting the original key with a first location-specific secure-key, the first location-specific secure-key located at a second encryption location, to create a location-specific initially-encrypted key; and (c) program code for finally encrypting the location-specific initially-encrypted key with a second location-specific secure-key, the second location-specific secure-key located at a third encryption location, to create a finally-encrypted key which may then be used in any way in a cipher-location; and wherein the locations are regions of memory located in computing devices operationally connected to the network computing-environment; and wherein each of the location-specific secure-keys is protected from compromise by any owner of other location-specific secure keys using an appropriate technique in the respective locations.

These and further embodiments will be apparent from the detailed description and examples that follow.

BRIEF DESCRIPTION OF THE DRAWINGS

The present invention is herein described, by way of example only, with reference to the accompanying drawing, wherein:

FIG. 2A is a simplified flowchart of the major operational steps in an exemplary implementation of a virtual safety-deposit-box approach to secure key encryption, according to preferred embodiments of the present invention;

FIG. 2B is a simplified flowchart of the major operational steps in an exemplary implementation of a virtual safety-deposit-box approach to secure key decryption, according to preferred embodiments of the present invention.

DESCRIPTION OF THE PREFERRED EMBODIMENTS

Figure 1B:
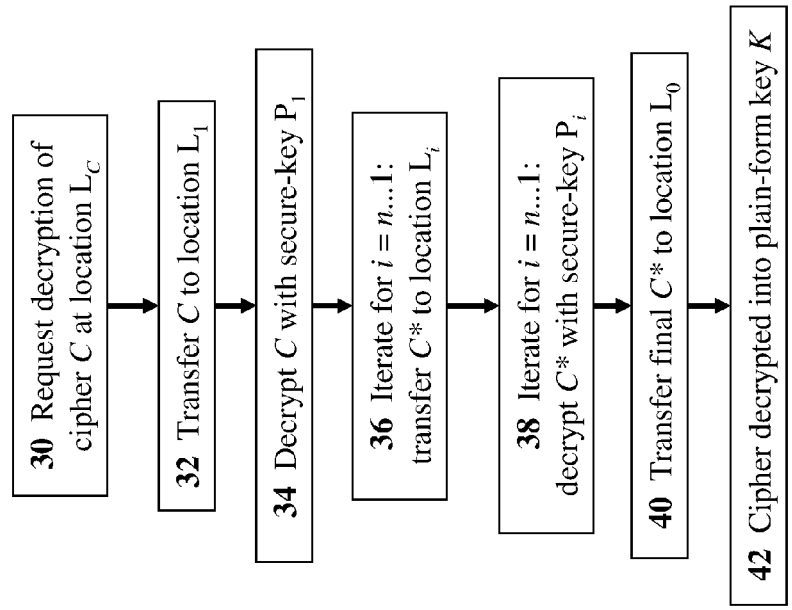
FIG. 1B is a simplified flowchart of the major operational steps in an exemplary implementation of secure key decryption, according to preferred embodiments of the present invention.

The present invention relates to methods, devices, and media for secure key management in a non-secured, distributed, virtualized environment with applications to cloud-computing security and management. The principles and operation for such methods, devices, and media, according to the present invention, may be better understood with reference to the accompanying description and the drawing.

Distributed resources are typically shared. Such sharing of resources is usually perceived as a security liability. In some preferred embodiments of the present invention, methods and devices for securing keys used in an insecure environment are to provided.

As an example, consider a sensitive resource that exists in a virtualized or cloud computing-environment. The resource may be any type of data or computing resource. The resource is to be secured using a technique that requires a secret such as a secure key (e.g. encryption in which the key may be an encryption key, password-based access in which the key may be the password, hashing in which the key may be the hash key, key sharing in which the key may be one of "M of N" keys, and locking in which the key may be necessary to open the lock on the resource). It is noted that the protection of keys referred to herein also refers to the protection of any secret.

To use keys securely in a virtualized or cloud environment, one needs to address the following situation (which is a trade-off):

on the one hand, since the environment may be insufficiently secure, it is not desirable to store keys in the environment; it may be possible to exploit the non-secure nature of the environment to discover the keys, which would expose the sensitive resource, while on the other hand, the keys must be available at the locations where the keys need to be used, such as virtualized and cloud environments which offer many benefits; it is desirable to use such environments, but in order to do so, the keys must be available in the environment.

There is also a management and convenience aspect, which arises when one manages keys securely in a virtualized or cloud environment. One needs to address the following situation (which is a trade-off):

on the one hand, one wishes to store keys in the location that is most secure, while on the other hand, the most secure location is not, in general, the most convenient or useful location.

There is also a legal aspect, which arises when one manages keys securely in a virtualized or cloud environment. One needs to address the following situation (which is a trade-off):

on the one hand, the provider of such an environment may be required by law to hand over data, including (inter alia) keys, stored in its environment, while on the other hand, the user of the environment wishes his/her data and keys to be under the user's complete control, such that the provider cannot hand the data and keys over simply because the provider does not control access to the data and keys.

An aspect of providing solutions to such trade-offs is to have keys available in a non-secure environment without losing security. Embodiments of the present invention secure such keys by introducing a new set of keys that is more secure (referred herein as a secure-key set); and protecting the original keys with the secure-key set.

Furthermore, the keys in the secure-key-set may each be in a different location and/or under the control of a different entity. This gives each entity that holds a key control over the use of keys in the non-secure environment mentioned above.

Furthermore, embodiments of the present invention allow one or more of the entities to be designated such that the keys (out of the secure-key set) that the entities control are never exposed to one or more of the other entities that hold keys in the secure-key set. This allows the previously-designated entities to control the protected resource without ever exposing their keys (out of the secure-key set) to subsequently-designated entities.

For example, the previously-designated entities may be customers, while subsequently-designated entities may be providers of services in the cloud network-environment. Such an arrangement allows the customers to control a protected resource without ever exposing their keys (out of the secure-key set) to the providers, even though the providers may still provide services regarding the protected resource.

Furthermore, each of the entities mentioned above may have different capabilities and sophistication. It is thus possible to have very advanced capabilities in some locations (e.g. an ability to generate numerous keys that could protect numerous entities with fine granularity), and capabilities optimized for convenience at other locations (e.g. a master key in the hands of a human user which does not change often and is used to protect many entities).

As an example, consider a key, K, protecting a sensitive resource, wherein:

$K = [b_1, b_2, b_3, \ldots b_n]$.

Each "$b_x$" may be a byte or bit of data, for example. If some or all $b_x$ becomes known to an unauthorized entity, then the key is exposed (in whole or in part), and as a result, the sensitive resource is exposed as well. K may be encrypted by encrypting the string of $b_x$. It may be encrypted, once or n times, using several different encryption methods $\epsilon = \{E_1, \ldots E_n\}$ and appropriate encryption keys $P = \{P_1, \ldots P_n\}$. It can be defined that:

$$C = \epsilon(K,P) = E_1(E_2(\ldots E_n(K,P_n), \ldots P_2), P_1).$$

In the above expression, P (which is the ordered set of $\{P_1, \ldots P_n\}$) is the secure-key set, and C is the encrypted form of K (i.e. the cipher of K). Each $E_x$ may be any type of encryption known in the art (e.g. a "symmetric" encryption, a public-private scheme, or a key-sharing scheme); and each $P_x$ may be any type of key known in the art (e.g. a symmetric key, a public-private key pair, or a key in a key-sharing to scheme).

C may be deciphered with an appropriate decryption "$\delta(\ )$" such that:

$$K = \delta(C,P) = D_n(\ldots D_2(D_1(C,P_1),P_2), \ldots P_n); K = \delta(\epsilon(K,P)).$$

In such an approach, each $D_x$ is the inverse of $E_x$, and $\delta$ is the inverse of $\epsilon$. K is considered secure in such a scheme if the secure key set P is safe, and if the cipher C is deciphered in close proximity to the time and location that K is to be used. In other words, the operation $\delta(\ )$ is applied only when K is actually needed, and the value K is thrown away when it is not needed.

Note that deciphering C under such constraints still allows flexibility, depending on the degree of security desired in a particular case. For example, the caching of K may be allowed (for various lengths of time) or forbidden. The strongest security may be achieved if no caching is allowed at all, meaning K must be deciphered immediately before use and discarded immediately after use. However, for reasons of convenience as an example, K may be cached. Embodiments of the present invention allow such choices; for example, such options may be chosen by a configuration.

It is noted that the case n=1 is a special case of the general description above, and is completely within the scope of the embodiments of the present invention.

The secure key set $P = \{P_1, \ldots P_n\}$ is kept safe by ensuring that:

1) each $P_x$ is always maintained in secure locations, including physical and/or virtual locations (e.g. locations outside the non-secure virtual/cloud environment, locations in a different virtual/cloud environment [since compromising multiple environments is much more difficult than compromising one environment], or locations in a different account in a given virtual/cloud environment [since compromising multiple accounts is more to difficult than compromising one account]);

2) each $P_x$ may optionally be in a different secure location so that even if one of the locations is compromised, the other locations are not, resulting in the overall scheme remaining secure; and 3) K is encrypted to create C, and C is decrypted to create K, using techniques which do not compromise the security of designated $P_x$ in their chosen secure location(s).

The criteria of item 3 above may be achieved, for example, by transferring an intermediate form of the cipher C (herein referred to as C*) to one of the locations where C* may be further decrypted using a $P_x$ available at that location, and then transferring the result to another location where a $P_y$ (a different secure-key element than $P_x$) is located. Thus, since C* is brought to $P_x$ in the secure location of $P_x$, the security of $P_x$ is not compromised by the operation.

To illustrate the example above in more detail, assume a set $\{P_i\}$ is found at secure locations $\{L_1, \ldots L_n\}$, while the cipher C is at location $L_C$, and K is needed at location $L_0$. Such "locations" refer to regions of memory located in devices in the network computing-environment in which the keys are maintained. Such locations can be maintained by one or more legal entity, meaning $L_x$ may or may not be located in physically-separate devices, but may be under the control of different entities.

To decrypt C and obtain K securely, securely transfer C (e.g. using secure communications) from $L_C$ to $L_1$, then decrypt C at $L_1$ using $P_1$. Such a procedure results in an intermediate form of K (herein referred to as K*), which still encrypted with $L_2, \ldots L_n$.

Now, securely transfer K* to $L_2$, and decrypt K* using $P_2$. In general, after decrypting K* (which is being modified at each decryption step of the process) at locations $\{L_1, \ldots L_i\}$, securely transfer K* to location $L_{i+1}$, and decrypt K* using $P_{i+1}$ until decryption has been performed at all secure locations $\{L_1, \ldots L_n\}$. Finally, the result (which is K) must be securely transferred to location $L_0$.

The criteria of item 3 may also be achieved, in another example, by transferring $P_x$ to another location (say $L_y$, which is different from its original location $L_x$), but only in a protected form which preserves its security. Such protected forms may be, for example, an encryption which allows $P_x$ to be stored or cached at $L_y$, and later retrieved, decrypted, and used at $L_x$.

Yet another example for achieving the criteria of item 3 involves a protected form that may be a homomorphic encryption which allows $P_x$ to be used at $L_y$ without its original value being known at $L_y$, or indeed any type of encryption which allows $P_x$ to be used at $L_y$ without its original value being known at $L_y$.

Conversely, it may be desired in some cases (for example, because of convenience) to transfer one of the $P_x$ to the location of C or one of its intermediate forms (K*) without protection; such a case would constitute a partial relaxation of the criteria of item 3 by applying the criteria to some, but not all locations. As stated above, such trade-offs between the strongest security and the needs of a particular situation are allowed, so long as a sufficient number of locations are secure to ensure an acceptable level of overall security. This is one type of compromise on item 3 above (i.e. trading security for convenience).

The security of implementations of the methods described depends, inter alia, on the security of the specific locations $L_C$, $L_0$, $\{L_1 \ldots L_n\}$. More locations, and more secure locations, increase the security of the implemented system; while fewer locations may be chosen for reasons of adequate security and convenience, for example.

The security of implementations described above also depends, inter alia, on the strength of the techniques used to meet the criteria of item 3 above. As mentioned, one can use strong techniques (e.g. never allowing $P_x$ to leave its secure location, allowing transfer only after homomorphic encryption, and requiring encryption before transfer for caching or storage) or weak ones (e.g. no protection). Strong techniques for more locations increase security, while fewer may be chosen for adequate security and convenience. However, one must always use some strong techniques to meet the criteria of item 3.

It may occur that a $P_x$ is used to encrypt in one location, and the same $P_x$ is used to decrypt in another location (e.g. where $P_x$ is a public-private key pair). In such a case, the set of secure locations $\{L_1, \ldots L_n\}$ is different during encryption and during decryption.

An aspect of the approach described above is that security does not depend on any one location. In general, it is a fact of life that no location is ever "perfectly" secure, yet by choosing a sufficient number of locations each with "pretty good" security, one may achieve acceptable security.

Another aspect of the approach described above is that the key to the sensitive resource (i.e. the one that needs to be protected) cannot be completely decrypted at any of the locations $\{L_1, \ldots L_n\}$ except for the last one, nor is the key available to the personnel or other functions of these locations. The user is therefore ensured of obtaining security services from multiple locations $\{L_1, \ldots L_n\}$, yet the personnel and functions at these locations (except for the last one) may not access the user's resource. In addition, the personnel and functions at each location can only obtain a $P_x$ that is allowed for their location; they cannot obtain any other $P_y$ from the secure-key set.

Implementations of such embodiments can include multiple legal entities serving as the safeguards of the secure keys, creating a "chain of custody" for key management.

Another aspect of the approach described above is that it is permitted (but not required) that one or more of the secure locations $\{L_1, \ldots L_n\}$ coincides with $L_C$ (the location of the cipher C) or $L_0$ (the location where K is needed); it is also permitted that $L_C$ and $L_0$ are the same location. Selecting $L_C$ and $L_0$ to be the same location may be a choice made for convenience. Since K is finally produced at the last location $L_n$, it may be a convenient choice (though not required) that $L_n$ and $L_0$ are the same.

Figure 1A:
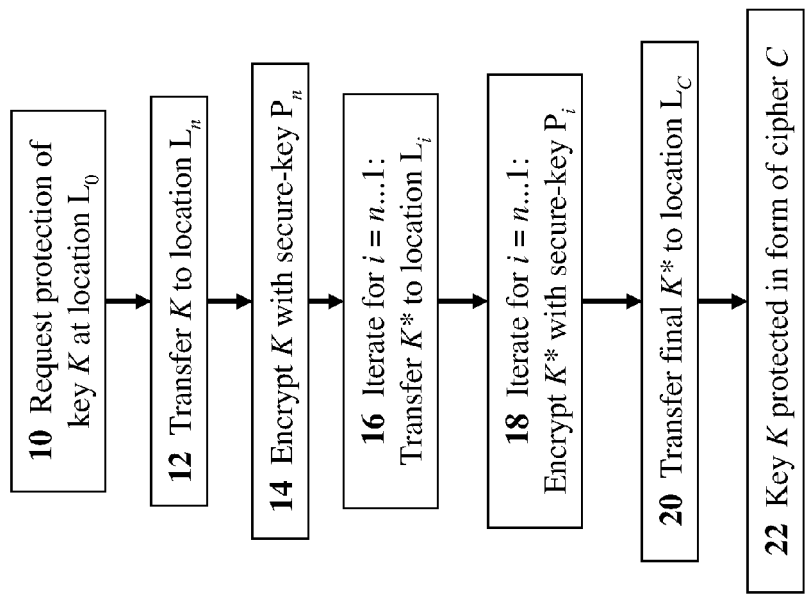
FIG. 1A is a simplified flowchart of the major operational steps in an exemplary implementation of secure key encryption, according to preferred embodiments of the present invention.

Referring now to the drawing, FIG. 1A is a simplified flowchart of the major operational steps in an exemplary implementation of secure key encryption, according to preferred embodiments of the present invention. The process starts when a request is received for protection of key K at location $L_0$ (Step 10). K is then transferred to location $L_n$ (Step 12), and encrypted with secure-key $P_n$ (Step 14), creating K*. The transfer and encryption steps are iterated for all values of i from n to 1 (i.e. transfer K* to location $L_i$, Step 16, and encrypt K* with secure-key $P_i$, Step 18, respectively). Then, the final K* (which is C) is transferred to location $L_C$ (Step 20) where the key K is protected in the form of cipher C (Step 22).

FIG. 1B is a simplified flowchart of the major operational steps in an exemplary implementation of secure key decryption, according to preferred embodiments of the present invention. The decryption process starts when a request is received for decryption of cipher C at location $L_C$ (Step 30). C is then transferred to location $L_1$ (Step 32), and decrypted with secure-key $P_1$ (Step 34), creating an intermediate form of C (i.e. C*). The transfer and decryption steps are iterated for all values of i from n to 1 (i.e. transfer C* to location $L_i$, Step 36, and decrypt C* with to secure-key $P_i$, Step 38, respectively). Then, the final C* (which is K) is transferred to location $L_0$ (Step 40) where the cipher is decrypted into the plain-form key K (Step 42).

Using a virtual "safety-deposit box" approach to secure keys, one or more of the secure locations $L_C$, $L_0$, and $\{L_1, \ldots L_n\}$ may be chosen to be under the control of the user(s), while other secure locations may be under the control of one or more providers of services. In particular, $L_n$ and $L_0$ may be chosen to be under the control of the user in an analogous way that safety-deposit boxes are maintained and managed in banks and other secure facilities, where the user (or the owner of the safety-deposit box) controls access to his/her resources (or valuables).

Such a choice means that the user is ensured that none of the providers can obtain access to the sensitive resource. It also means that the providers cannot obtain access to any of the $P_x$ not allowed to them. This is because, as noted above, both the sensitive resource and the secure-key set cannot be accessed by the personnel and functions at the other locations. Implementations of such embodiments can utilize the chain-of-custody approach for key management mentioned above by including multiple legal entities.

Furthermore, such a virtual safety deposit-box approach is open to the trade-offs mentioned above; for example, one may choose to transfer the cipher C (or one of its intermediate forms (K*)) to the location of a $P_x$, or one may choose to transfer a $P_x$ to the location of C (or one of its K*) using any technique that meets the criteria of item 3 above (e.g. never allowing $P_x$ to leave its secure location, allowing transfer only after homomorphic encryption, and requiring encryption before transfer for caching or storage).

FIG. 2A is a simplified flowchart of the major operational steps in an exemplary implementation of a virtual safety-deposit-box approach to secure key encryption, according to preferred embodiments of the present invention. The process starts when a request is received for protection of key K at location $L_0$ (Step 50). At $L_0$, secure-key $P_1$ is retrieved from location $L_1$ (Step 52). The transfer step is iterated for all values of i from n to 2 (i.e. At $L_0$, retrieve secure-key $P_i$ from location $L_i$, Step 54). An encryption step is then iteratively performed for all values of i from n to 1 (i.e. At $L_0$, use $P_1$ through $P_n$ to encrypt K, Step 56). This step creates cipher C which is then stored (Step 58).

FIG. 2B is a simplified flowchart of the major operational steps in an exemplary implementation of a virtual safety-deposit-box approach to secure key decryption, according to preferred embodiments of the present invention. The process starts when a request is received for decryption of cipher C at location $L_0$ (Step 60). At $L_0$, secure-key $P_1$ is retrieved from location $L_1$ (Step 62). The transfer step is iterated for all values of i from 2 to n (i.e. At $L_0$, retrieve secure-key $P_i$ from location $L_i$, Step 64). A decryption step is then iteratively performed for all values of i from 1 to n (i.e. At $L_0$, use $P_1$ through $P_n$ to decrypt C, Step 66). This step generates key K which is then available for use (e.g. to decrypt a message) (Step 68).

When a user desires to secure a sensitive resource, the user may not care about the particular value of the key $K=[b_1, b_2, b_3, \ldots b_n]$ used for security. In such a case, embodiments of the present invention may automatically generate a value of K (e.g. using key-generating software).

Such an embodiment of the present invention provides an additional security enhancement as the key K is not known to anyone, not even the user, but rather is only saved in some appropriately secure form (e.g. a cipher or in a high-security to location). The key K may be automatically created using rules that ensure the key is a "strong" key. For example, such rules can be based on the key's length, the specific $b_x$ that may or must be used, and/or the degree of randomness applied to selecting $b_x$.

Another embodiment of the present invention relates to "one-time" keys which may be used separately or in conjunction with the embodiments described above. In a non-secure virtual or cloud environment, there are many computing resources. For example, such computing resources may be instances providing computation power, or instances providing storage capacity. It may be desired to add such resources to a user's portion of the environment (e.g. a project or account).

This may mean that the resource is taken from the general pool of resources available in the overall environment, and made available for use specifically within the user's portion of the environment. When resources are so added, it may be necessary to establish trust in the new resource. For example, it may be desired to ensure that the resource is being added for a legitimate goal desired by and known to the user.

To achieve such trust, one-time keys can be introduced by a provider available at a secure location $L_T$. The user is able to communicate with the provider, and be authenticated to the provider (e.g. via secure communications). Once the user is securely authenticated, the provider may issue a one-time key to the user with a value $O=[b_1, b_2, b_3, \ldots b_m]$.

The user may then provide O to the resource. The resource may then send O to the provider over a secure channel. Such a procedure provides proof to the provider that the resource is trusted by the user, and therefore the provider is willing to trust O. The provider accepts a particular O once and only once, ensuring that trust cannot be to established using the same O at a later time, whether by mistake or by malicious attackers who have eavesdropped or copied O.

The provider may generate O using rules that ensure the one-time key is a strong key. For example, such rules can be based on the key's length, the specific $b_x$ that may or must be used, and/or the degree of randomness applied to selecting $b_x$. Once the provider trusts a resource, the provider may allow the resource any function or role that requires trust (e.g. allowing the resource to be one of the secure locations described above).

Another embodiment of the present invention relates to the storage of secure keys. It may occur that a key K is encrypted as cipher C as described above, and it is desirable to store C for later use. Storage may be offered at one (or more) of the locations. Cipher C may be saved under a name or index for later retrieval. The user may be provided, for example, with software libraries that retrieve encrypted keys from such storage, and use other techniques described herein to decrypt the desired, stored keys in a few convenient operations.

While the present invention has been described with respect to a limited number of embodiments, it will be appreciated that many variations, modifications, and other applications of the invention may be made.

What is claimed is:

1. A method for secure key management, the method comprising the steps of:
   (a) receiving an encryption request for protecting an original key at a first encryption location in a network computing-environment;
   (b) initially encrypting said original key with a first location-specific secure-key, said first location-specific secure-key located at a second encryption location, to create a location-specific initially-encrypted key; and
   (c) finally encrypting said location-specific initially-encrypted key with a second location-specific secure-key, said second location-specific secure-key located at a third encryption location, to create a finally-encrypted key which may then be used in any way in a cipher-location;
   wherein said locations are regions of memory located in computing devices operationally connected to said network computing-environment; and
   wherein each of said location-specific secure-keys is protected from compromise by any owner of other location-specific secure keys using an appropriate technique in respective said locations.

2. The method of claim 1, wherein said step of initially encrypting is performed by transferring said original key to said second encryption location.

3. The method of claim 1, wherein said step of finally encrypting is performed by transferring said location-specific initially-encrypted key to said third encryption location.

4. The method of claim 1, wherein said step of initially encrypting is performed by transferring said first location-specific secure-key to said first encryption location.

5. The method of claim 1, wherein said step of finally encrypting is performed by transferring said second location-specific secure-key to said first encryption location or said second encryption location.

6. The method of claim 1, wherein at least two of said first encryption location, said second encryption location, and said third encryption location are the same location.

7. The method of claim 1, wherein said step of encrypting is performed iteratively at subsequent encryption locations using subsequent location-specific secure-keys to create location-specific intermediately-encrypted keys, and wherein said finally-encrypted key is a final result of said location-specific intermediately-encrypted keys.

8. The method of claim 1, wherein said appropriate technique is selected from the group consisting of: forbidding transfer of any said secure-key from its respective said location, allowing transfer of any said secure-key only after homomorphic encryption, allowing transfer of any said secure-key only after applying an encryption process which allows said secure-key to be used securely without its original value becoming freely-accessible, and allowing transfer of any said secure-key for caching or storage only after encryption.

9. The method of claim 1, the method further comprising the steps of:
   (d) upon receiving a decryption request for decrypting said finally-encrypted key at said cipher location, initially decrypting said finally-encrypted key with said second location-specific secure-key to create a location-specific initially-decrypted key; and (e) finally decrypting said location-specific initially-decrypted key with said first location-specific secure-key to generate a finally-decrypted key which is said original key.

10. The method of claim 1, wherein said step of initially decrypting is performed by transferring said finally-encrypted key to said second encryption location.

11. The method of claim 1, wherein said step of finally decrypting is performed by transferring said location-specific initially-decrypted key to said first encryption location.

12. The method of claim 1, wherein said step of initially decrypting is performed by transferring said second location-specific secure-key to said cipher location.

13. The method of claim 1, wherein said step of finally decrypting is performed by transferring said first location-specific secure-key to said cipher location or said second location.

14. The method of claim 9, wherein said step of decrypting is performed iteratively at subsequent decryption locations using subsequent location-specific secure-keys to create location-specific intermediately-decrypted keys, and wherein said finally-decrypted key is a final result of said location-specific intermediately-decrypted keys.

15. The method of claim 1, the method further comprising the step of:

(d) upon receiving a decryption request for decrypting said finally-encrypted key at said cipher location, locating said location-specific secure-keys in entity locations other than said cipher location, wherein said entity locations are maintained by at least two respective legal entities for controlling said location-specific secure-keys, whereby said step of locating facilitates fulfilling said decryption request.

16. A device for secure key management, the device comprising:

(a) a server including:
   (i) a CPU for performing computational operations;
   (ii) a memory module for storing data; and
   (iii) a network connection for communicating across a network; and (b) a protection module, residing on said server, configured for:
   (i) receiving an encryption request for protecting an original key at a first encryption location in a network computing-environment;
   (ii) initially encrypting, on any computing device operationally connected to said network computing-environment, said original key with a first location-specific secure-key, said first location-specific secure-key located at a second encryption location, to create a location-specific initially-encrypted key; and
   (iii) finally encrypting, on any computing device operationally connected to said network computing-environment, said location-specific initially-encrypted key with a second location-specific secure-key, said second location-specific secure-key located at a third encryption location, to create a finally-encrypted key which may then be used in any way in a cipher-location;

wherein said locations are regions of memory located in computing devices operationally connected to said network computing-environment; and wherein each of said location-specific secure-keys is protected from compromise by any owner of other location-specific secure keys using an appropriate technique in respective said locations.

17. The device of claim 16, wherein said initially encrypting is performed by transferring said original key to said second encryption location.

18. The device of claim 16, wherein said finally encrypting is performed by transferring said location-specific initially-encrypted key to said third encryption location.

19. The device of claim 16, wherein said initially encrypting is performed by transferring said first location-specific secure-key to said first encryption location.

20. The device of claim 16, wherein said finally encrypting is performed by transferring said second location-specific secure-key to said first encryption location or said second encryption location.

21. The device of claim 16, wherein at least two of said first encryption location, said second encryption location, and said third encryption location are the same location.

22. The device of claim 16, wherein said encrypting is performed iteratively at subsequent encryption locations using subsequent location-specific secure-keys to create location-specific intermediately-encrypted keys, and wherein said finally-encrypted key is a final result of said location-specific intermediately-encrypted keys.

23. The device of claim 16, wherein said appropriate technique is selected from the group consisting of: forbidding transfer of any said secure-key from its respective said location, allowing transfer of any said secure-key only after homomorphic encryption, allowing transfer of any said secure-key only after applying an encryption process which allows said secure-key to be used securely without its original value becoming freely-accessible, and allowing transfer of any said secure-key for caching or storage only after encryption.

24. The device of claim 16, wherein said protection module is further configured for:

(iv) upon receiving a decryption request for decrypting said finally-encrypted key at said cipher location, initially decrypting said finally-encrypted key with said second location-specific secure-key to create a location-specific initially-decrypted key; and
(v) finally decrypting said location-specific initially-decrypted key with said first location-specific secure-key to generate a finally-decrypted key which is said original key.

25. The device of claim 16, wherein said protection module is further configured for:

(iv) upon receiving a decryption request for decrypting said finally-encrypted key at said cipher location, locating said location-specific secure-keys in entity locations other than said cipher location, wherein said entity locations are maintained by at least two respective legal entities for controlling said location-specific secure-keys, whereby said locating facilitates fulfilling said decryption request.

26. A computer-readable storage medium having computer-readable code embodied on the computer-readable storage medium, the computer-readable code comprising:

(a) program code for receiving an encryption request for protecting an original key at a first encryption location in a network computing-environment;
(b) program code for initially encrypting said original key with a first location-specific secure-key, said first location-specific secure-key located at a second encryption location, to create a location-specific initially-encrypted key; and (c) program code for finally encrypting said location-specific initially-encrypted key with a second location-specific secure-key, said second location-specific secure-key located at a third encryption location, to create a finally-encrypted key which may then be used in any way in a cipher-location; and wherein said locations are regions of memory located in computing devices operationally connected to said network computing-environment; and wherein each of said location-specific secure-keys is protected from compromise by any owner of other location-specific secure keys using an appropriate technique in respective said locations.

* * * * *